United States Patent [19]

Dowdall

[11] Patent Number: 4,651,969
[45] Date of Patent: Mar. 24, 1987

[54] VALVE ACTUATOR

[75] Inventor: Dennis S. Dowdall, Surrey, England

[73] Assignee: Telektron Limited, Surey, England

[21] Appl. No.: 657,777

[22] Filed: Oct. 4, 1984

[30] Foreign Application Priority Data

Oct. 7, 1983 [GB] United Kingdom ............... 8326917

[51] Int. Cl.[4] ................................... F16K 31/163
[52] U.S. Cl. .................... 251/14; 74/424.8 VA; 251/58; 251/63.4; 251/252; 92/33
[58] Field of Search ............. 251/58, 63.4, 14, 252, 251/229, 291, 292, 95, 96; 137/553, 556.3; 192/34, 54, 56 F; 74/424.8 VA; 92/31, 32, 33

[56] References Cited

U.S. PATENT DOCUMENTS

| | | | |
|---|---|---|---|
| 1,341,319 | 5/1920 | Hodges | 137/553 X |
| 1,648,710 | 11/1927 | Wright | 251/14 |
| 1,776,228 | 9/1930 | Coffman | 92/33 X |
| 2,199,328 | 4/1940 | Baer et al. | 92/31 X |
| 2,225,790 | 12/1940 | Nardonez | 92/33 X |
| 2,315,775 | 4/1943 | D'Arcey | 251/253 X |
| 2,318,010 | 5/1943 | Panish | 74/625 |
| 2,340,999 | 2/1944 | Trott | 251/14 X |
| 2,608,374 | 8/1952 | Morehead | 251/14 X |
| 3,159,378 | 12/1964 | Haag | 251/14 X |
| 3,298,659 | 1/1967 | Cupedo | 251/58 X |
| 3,319,925 | 5/1967 | Kojima et al. | 251/252 X |
| 3,542,331 | 11/1970 | Canalizo | 251/14 |
| 4,161,242 | 7/1979 | Moores, Jr. et al. | 192/34 |
| 4,436,280 | 3/1984 | Geisow | 251/14 X |
| 4,504,038 | 3/1985 | King | 251/253 X |

FOREIGN PATENT DOCUMENTS

| | | | |
|---|---|---|---|
| 14987 | of 1898 | United Kingdom | 92/32 |
| 898131 | 6/1962 | United Kingdom | 251/14 |

Primary Examiner—Samuel Scott
Assistant Examiner—Allen J. Flanigan
Attorney, Agent, or Firm—Watson, Cole, Grindle & Watson

[57] ABSTRACT

A valve actuator for a subsea oil well installation includes a rotatable adjusting member (53) for engagement with the valve spindle, and a linear fluid actuator (17) coaxial with the adjusting member and operable by fluid pressure pulses to index the adjusting member around selectively in either direction. A mechanical movement converts linear motion of the actuator to rotary motion of the adjusting member. A fluid operated clutch selectively connects the fluid actuator to the adjusting member. A shaft (65) projects from the rear end of the actuator casing to permit manual adjustment as well. Position sensors (120) emit signals indicative of the valve position, and a pointer (123) at the rear of the casing provides a visual indication of the valve condition.

22 Claims, 10 Drawing Figures

VALVE ACTUATOR

This invention relates to a valve actuator and is concerned in particular with an actuator suitable for use under water, e.g. as part of an oil well installation located on the seabed.

There are known valve actuators in which a rotatable member adapted to engage the valve spindle is indexed around by means of a form of ratchet mechanism operated by an hydraulic cylinder mounted with its axis transverse to the rotational axis of said member. A drawback of these known actuators is that they project substantially in the transverse direction and do not facilitate valve maintenance operations by means of remotely controlled equipment.

The present invention seeks to eliminate the above drawback and accordingly provides a valve actuator comprising a support frame, a rotatable valve adjusting member carried by the frame for engagement with a valve spindle, linear fluid actuator means mounted on the frame substantially coaxially with said valve adjusting member, and means for converting linear movement into rotation coupled between the actuator means and the valve adjusting member whereby, in response to fluid pressure signals supplied to the actuator means, the valve adjusting member can be indexed around selectively in either direction for adjusting the spindle of a valve to which the actuator is connected.

By arranging the piston and cylinder device coaxially with the rotatable valve adjusting member, the transverse dimension can be substantially reduced and it becomes easily possible to mount and detach the actuator by means of remotely controlled equipment so that maintenance procedures can be simplified and performed remotely.

In accordance with a preferred embodiment of the invention there is provided a valve actuator comprising a support frame, a rotatable valve adjusting member carried by the frame for engagement with a valve spindle, linear fluid actuator means mounted on the frame substantially coaxially with said valve adjusting member, means for converting linear movement into rotation including a slide member coupled to the linear fluid actuator means to be driven thereby in either direction from a central position, a sleeve member and means acting between the slide member and sleeve member for the sleeve member to be rotated in response to displacement of the slide member longitudinally of the sleeve member, disengageable rotary driving means including a driving member fast with said sleeve member, and a driven member fast with said valve adjusting member, a spring device coupled to the sleeve member normally to hold the driving member in a position disengaged from the driven member, the driving member being movable in either direction from the disengaged position to engage the driven member, fluid pressure actuated means coupled to the sleeve member to shift the sleeve member axially to engage the driven member, means for supplying fluid pressure signals to the linear fluid actuating means and the fluid pressure actuated means to displace the sleeve member axially to engage the driving and driven members and then rotate the sleeve, whereby the actuation is operable to index the valve adjusing member around in either direction, and a device coupled to the valve adjusting member to enable the adjusing member to be rotated manually when the rotary driving means is disengaged.

A better understanding of the invention will be had from the following detailed description which is given by way of example with reference to the accompanying drawings, in which.

Figure 1:
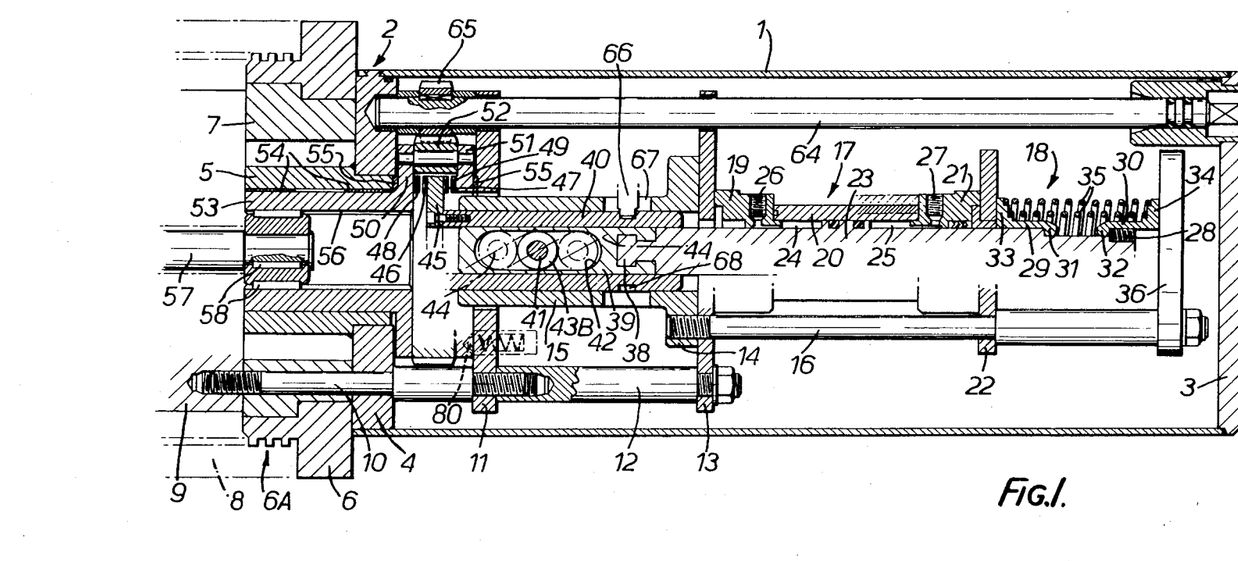
FIG. 1 is an axial section through an actuator in accordance with the invention.
Figures 2, 3:
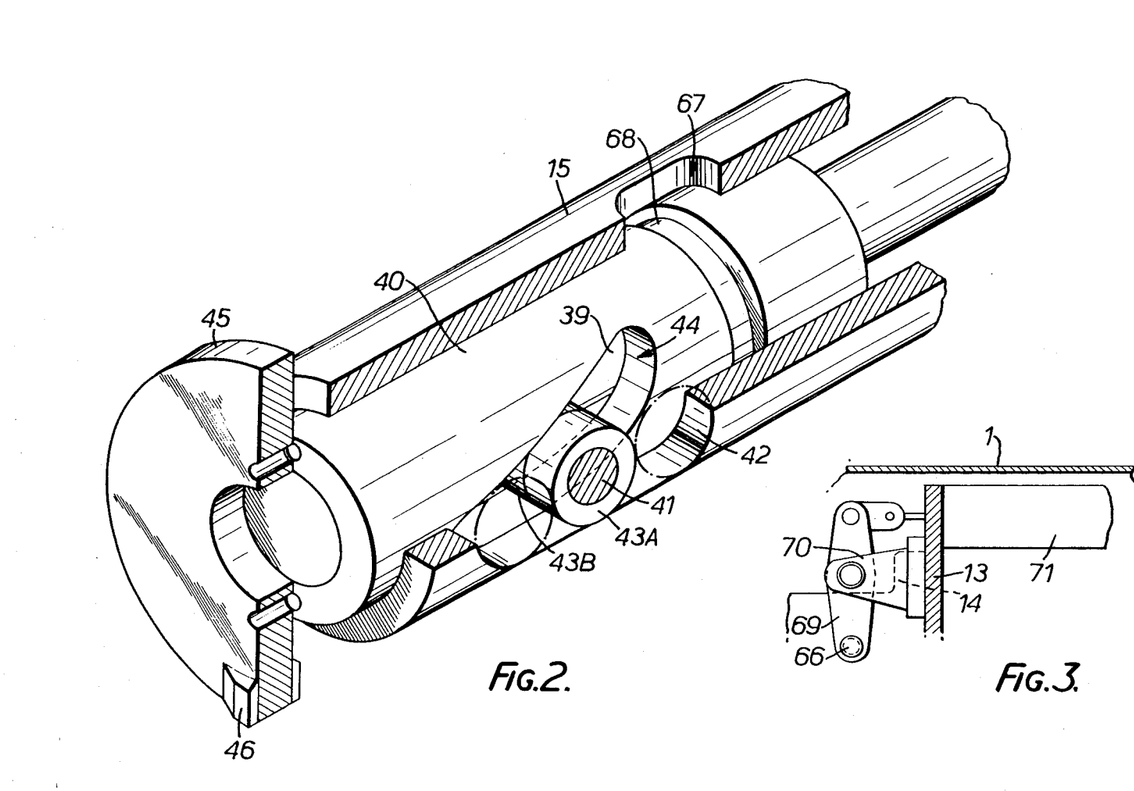
FIG. 2 is a partly cut-away perspective view of the mechanism for converting linear motion into rotary movement.
FIG. 3 is a sketch illustrating a detail of the actuator.

The embodiment of the invention shown in FIGS. 1 to 3 of the drawings has a casing including a cylindrical body 1 and front and rear ends 2, 3. The front end of the casing includes an annular plate 4 and a cylindrical part 5 which is welded to the plate. Rotatable relative to the casing and supported by an annular member 7 surrounding the part 5 is a ring 6 having a screw thread 6A for connecting the actuator to the housing 8 of a valve. A screw connection with the valve housing is not essential and other forms of quick release coupling could be used, such as a bolted flange in place of the ring 6. The front end 2 of the casing is connected to studs 10 passing through the member 7 to internal valve parts 9, which can be withdrawn axially from the housing 8. The inner ends of the studs 10 mount an annular support plate 11 and also provides attachment points for tie bars 12 which carry a further support plate 13. Fixedly mounted on the support plate 13 by a flange 14 is a stationary guide tube 15. The flange 14 is attached to the plate 13 by tie bars 16 which serve also to support an hydraulic piston and cylinder device 17 and a piston centering device 18, both of which are of a construction known per se. The device 17 has a cylinder made up of three parts 19, 20, 21 held clampled together between the plate 13 and a further plate 22 by the tie bars 16. A piston 23 is slidable in the cylinder and includes an integral piston rod which projects through each end of the cylinder. The piston separates two annular chambers 24, 25 to which hydraulic fluid is delivered through ports 26, 27 provided in the end parts 19, 21 of the cylinder for moving the piston in either direction from the centre position in which it is depicted in FIG. 1. The rear end portion of the piston rod projects through the plate 22 and has axially opposed shoulders provided by a step on the piston rod and a set screw 28 screwed onto the end of the piston rod. A pair of collars 29, 30 are slidable on the rear end portion of the piston rod and have inwardly directed flanges 31, 32 for abutment with the respective shoulders and external flanges 33, 34 which are urged apart by springs 35 and are arranged to be supported against the plate 22 and an end support plate 36, respectively. The plate 36 is supported at a fixed distance from the plate 22 by the tie bars 16. If the piston 23 is displaced away from its centre position one of the collars 29, 30 is moved away from its supporting plate 22, 36 and the springs 35 are compressed to provide a restoring force to return the piston to the centre position when the driving force is removed.

The forward end of the piston rod projects forwardly through the plate 13 and is provided with an extension 38 of T-shaped cross-section by means of which the piston rod is drivingly coupled to a slide member 39 having a transverse slot to receive the piston rod extension 38. The member 39 is slidable in a sleeve 40 which is itself slidable and rotatable in the stationary guide tube 15. The connection between the piston rod and the slide member 39 allows for slight misalignment between the axes of the piston rod and the guide tube 15, but the piston rod and slide member could be integral with each other.

The slide member is fitted with a transverse pin 41 which forms an axle for two pairs of rollers 43A, 43B located on either side of the slide member. The guide tube 15 has opposed longitudinal slots 41 (illustrated for convenience in FIG. 1 although on a true axial section the slot 42 would not be visible) and the outer rollers 43A carried on the pin 41 engage in these slots. The sleeve 40 is provided with opposed helical slots 44, seen in FIG. 3 and depicted schematically by the broken lines 44 in FIG. 1, and the inner rollers 43B carried on the pin 41 engage in these helical slots. Thus, from the foregoing description it will be understood that axial displacement of the slide member 39 will cause the sleeve 40 to be rotated if the latter is held against axial displacement. The sleeve 40 is in fact capable of limited axial travel as will become clear.

Attached firmly to the forward end of the sleeve 40 by bolts is a flange plate 45 having driving teeth 46,47 on its opposite faces and spaced apart around its periphery. The teeth 46,47 are arranged to cooperate with complementary teeth 48,49, respectively provided on a pair of annular plates 50,51. Sandwiched and firmly bolted between the plates 50,51 is a ring gear 52, the purpose for which is described later. The plate 50 is constituted by an integral flange of a rotary valve adjusting member 53 which is journalled in the actuator casing by bearings 54 and supported axially by thrust bearings 55. The member 53 has an axial bore with longitudinal grooves 56 and the valve spindle 57 is received in the bore and held rotationally fast with the member 53 by keys 58. The keyed connection between the adjusting member and the valve spindle allows the latter to move axially relative to the actuator during valve adjustments. The flange plate 45 with its teeth 46, 47 and the plates 50, 51 with their teeth 48,49 constitute disengageable rotary driving means for coupling the sleeve 40 to the valve adjusting member 53.

Extending longitudinally of the actuator and journalled in the end 4 of the casing and in the support plate 11, is a shaft 64 carrying a pinion 65 in mesh with the ring gear 52. The rear end of the shaft is square and projects into an external socket at the rear end of the actuator whereby the shaft can be engaged by a tool and rotated manually for turning the member 53 to adjust the valve. This facility enabling the actuator to be operated manually is provided to allow the valve to be adjusted if there is a failure in the power control system.

The teeth 46, on the flange plate 45 can be brought into cooperative engagement with the teeth 48 on the flange 50 for driving the member 53 in a first, e.g. clockwise direction, by shifting the sleeve 40 axially forwardly, and the teeth 47 can similarly be brought into driving cooperation with the teeth 49 for turning the member 53 in the opposite, i.e. counter clockwise direction, by a short rearward shift of the sleeve 40. For adjusting the axial position of the sleeve 40 there is provided a mechanism including a pin 66 which passes through a longitudinal slot 67 in the guide tube 15 and engages in a peripheral groove 68 in the sleeve. The pin 66 is carried by one arm of a lever 69 (FIG. 3) which is pivoted on a stationary support 70 mounted on a convenient structure, such as the plate 13 or the flange 14. The second arm of the lever 69 is connected to an hydraulic piston and cylinder device 71 also mounted conveniently on the plate 13. The device 71 is coupled to an hydraulic control system together with the piston and cylinder device 17 so that when fluid is supplied to chamber 25 to drive the piston 23 forward the device 71 is operated to rotate the lever 69 and shift the sleeve 40 forwardly, and when fluid is supplied to chamber 24 to drive the piston rearwardly the device 71 is actuated to shift the sleeve 40 rearwardly.

In the normal condition the parts of the valve actuator will occupy the positions as illustrated in FIG. 1, the piston 23 being held in its centre position by the springs 35 of the centering device 18, and the flange plate 45 being in an intermediate position disengaged from the plates 50 adn 51. To adjust the valve, say by clockwise rotation of the spindle 57, hydraulic pressure pulses are supplied to the chamber 25 of hydraulic cylinder 17 and to the hydraulic cylinder 71. During each pulse, the piston 23 is driven forwards and in turn pushes forwardly the slide member 39. Simultaneously the lever 69 is pivoted to displace forwardly the sleeve 40. During a short initial part of its axial displacement the slide member 39 moves with the sleeve 40 until the flange plate 45 abuts the plate 50 with their respective teeth 46,48 are engaged. On further forward motion of the slide member 39 the sleeve is caused to rotate due to the engagement of the inner rollers 43B in the helical slots 44 in the sleeve, the slide member 39 being itself held against rotation by engagement of the outer rollers 43A in the slots 42. The rotation of sleeve 40 is transmitted to the adjusting member 53 through the flange plate 45, cooperating teeth 46,48, and flange 50. When the piston 23 reaches the end of the forward stroke the pressure in chamber 24 is released and, in the manner described above, the centering device 18 operates to retract the piston to its centre position pulling back with it the slide member 39. The sleeve 40 is also retracted to disengage the teeth 46, 48 so that the counter clockwise rotation of sleeve 40 and flange 45 produced by the rearward sliding movement of member 39 does not result in any unwanted reverse rotation of the adjusting member 53 during the piston return stroke. The teeth 46,48, and the teeth 47,49, are preferably provided with sloping rear surfaces which act to cam the plates 45,50 or 45,51 apart during the return strokes of the piston 23 thereby providing further security against reverse rotation of the adjusting member 53 in the event that the hydraulic cylinders 17, 71 do not operate exactly in phase with each other. When the piston is returned to its centre position the operating cycle is repeated for the next hydraulic pressure pulse. Thus, it will be understood that in response to a series of control pulses the valve adjusting member 53 will be indexed around in the clockwise direction to operate the valve on which the actuator is mounted.

From the foregoing description of the actuator operation it will be appreciated that control pressure pulses supplied to chamber 24 will result in the adjusting member being indexed around in a counter clockwise direction, in this case the teeth 47,49 being brought into cooperation during each driving stroke of the piston 23 rearwardly from its centre position.

To further preclude any unwanted rotation of the adjusting member 53 during the return strokes of the piston 23, a detent device may be provided e.g. as illustrated in broken lines in FIG. 1. The device consists of a spring loaded ball or roller 80 carried on the support plate 11 and arranged to cooperate with recesses spaced apart around the plate 51. Alternative forms of detent are also possible, such as an hydraulically operated device.

By arranging the piston and cylinder device 17 coaxially with the rotary adjusting member 53 it is possible for the entire actuator to be located within the outer diameter of the mounting ring 6 or flange. Thus, the ring 6 can be engaged by apparatus advanced longitudinally over the actuator for detaching the actuator from the valve casing and removing with it the internal valve parts 9 to which the actuator casing is connected by the studs 10. As a consequence remote controlled valve maintenance procedures are facilitated.

A modified valve actuator in accordance with the invention is illustrated in FIGS. 4 to 10. However, the construction is generally similar to the first embodiment so that a full detailed description is not considered necessary and only the main modifications will be explained. In the drawings the same reference numerals have been used to denote equivalent parts in the two embodiments.

Figure 4:
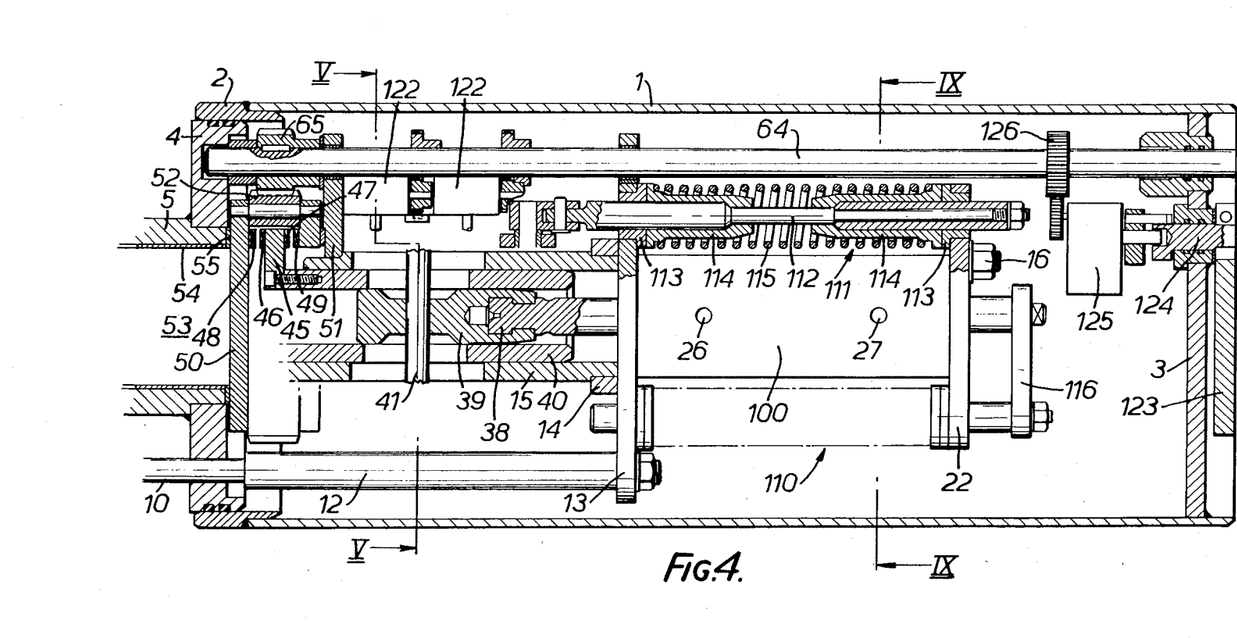
FIG. 4 is a view similar to FIG. 1 and illustrating a modified actuator embodying the invention.
Figure 5:
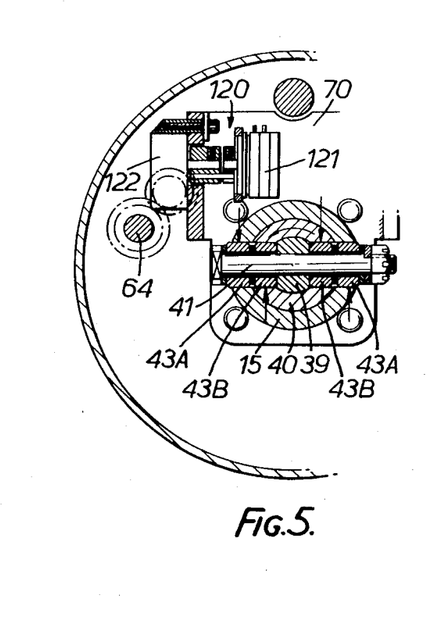
FIG. 5 is a section taken along the line V—V of FIG. 4.
Figure 6:
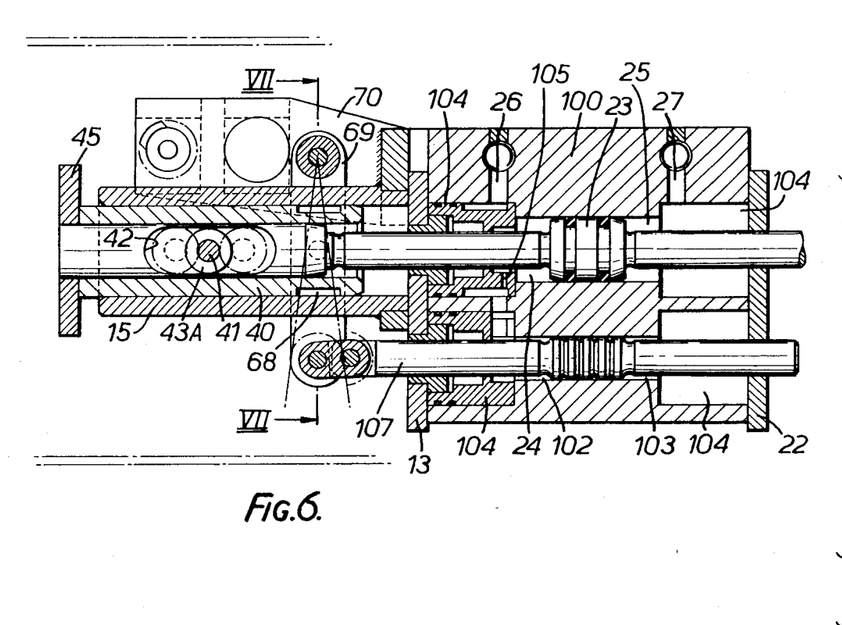
FIG. 6 is a partial axial section through the actuator of FIG. 4.

In FIG. 4 the releasable connection between the forward end of the actuator casing and the valve housing has not been shown, but any suitable quick release coupling may be used as for the actuator of FIGS. 1-3.

Figure 9:
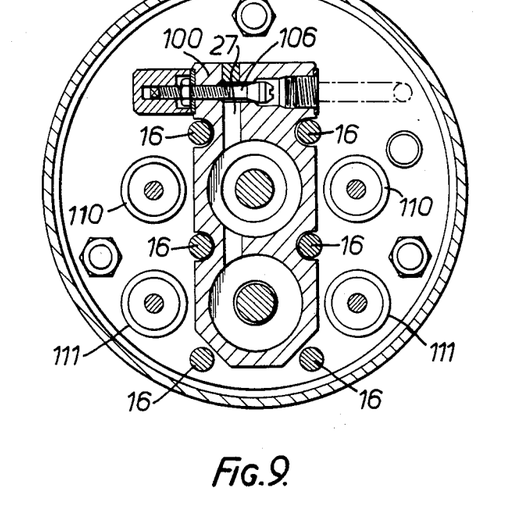
FIG. 9 is a section taken along the line IX—IX of FIG. 4.

Mounted between support plates 13 and 22 by tie bars 16 is an integral cylinder block 100 which is bored to define respective cylinders for the main piston 23 and for the piston 101 of the device which is actuable to shift the sleeve 40 backwards and forwards in the guide tube 15. The piston 101 separates annular chambers 102, 103 which communicate with ports 26 and 27 respectively. The piston rods of the two pistons 23, 101 are sealed to the cylinder block by members 104 received in counterbores in the cylinder block and one of which is shown in cross-section in FIG. 6. The cylinder chambers 24,25,102,103 communicate with the ports 26,27 via ports in the respective sealing members 104, the ports 105 leading to the chambers 24,25 being restricted so that, when hydraulic fluid is supplied to either port 26 and 24, the piston 101 will respond first to ensure that the sleeve 40 is shifted to bring the gear teeth 46,48 or 47,49 into cooperation before the main piston 23 is displaced to rotate the sleeve 40 and hence the rotary output member 53. For controlling the speed of actuation of the two pistons 23, 101, a flow rate adjuster 106 as shown in FIG. 9, may be provided to adjust the rate of flow of hydraulic fluid to the ports 26,27.

Figure 7:
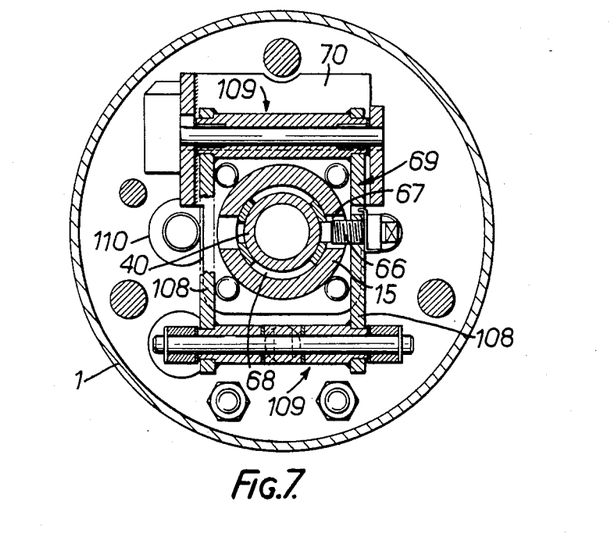
FIG. 7 is a section taken along the line VII—VII of FIG. 6.
Figure 8:
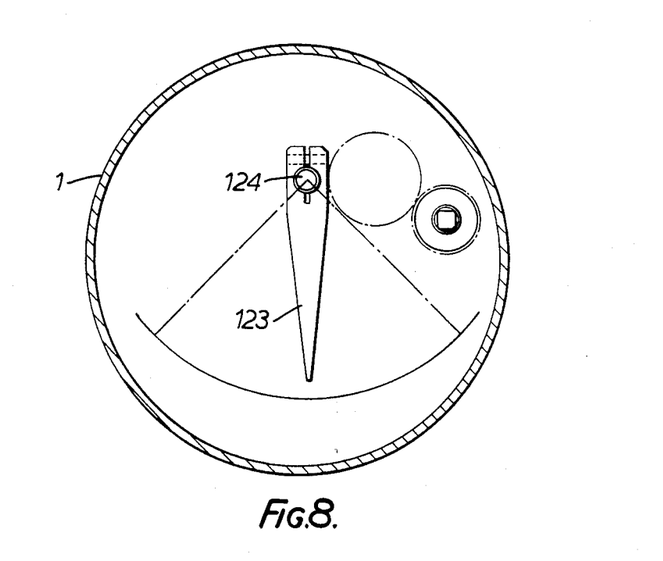
FIG. 8 is a rear end view of the actuator shown in FIG. 4.

The forward end of the piston rod 107 of piston 101 is connected by a pivot to the lever 69 which, as best seen in FIG. 7, comprises a pair of parallel arms 108 located on either side of the guide tube 15 and attached together at their ends by cross-members 109. The piston rod 107 is connected by a pivoted link to the centre of one cross-member 109, and the other cross member is pivoted between opposed side plates of a fixed support bracket 70 firmly mounted on the support plate 13. One of the side arms 108 carries the pin 66 which engages the groove 68 of sleeve 40 through the slot 67 in the guide tube 15. Thus, when piston 101 is driven forwardly by fluid pressure in chamber 103, lever 69 is rotated to push the sleeve forwardly, and when the piston is displaced rearwardly by fluid pressure in chamber 102 the lever 69 is rotated to pull back the sleeve 40.

For centering the pistons 23 and 101 in their cylindres two pairs of similar centering devices 110,111 are provided. One device 111 is shown in detail in FIG. 4 and is of essentially the same basic type as the centering device 18 of the actuator of FIG. 1. A rod 112 is slidably mounted relative to the support plates 13,22 by collars 113 and includes a pair of opposed shoulders for abutment by respective sleeves 114 which are urged apart by a spring 115. Displacement of the rod 112 in either direction from the central position causes the sleeves 114 to be moved together and hence the spring 115 to become compressed to generate a restoring force operable to return the rod 112 to the central position when it is relieved of the force responsible for its displacement.

The first pair of centering devices 110 are located on either side of the piston 23 and are connected to the rear end of the piston rod of this piston by a member 116 so that the rods 112 of the centering devices are constrained to move axially with the piston 23. The second pair of centering devices 111 are coupled to the piston 101 through the lever 69, the forward ends of the rods 112 of these centering devices being connected by pivotal links to the opposite ends of the lever cross-member 109 to which the piston rod 107 is coupled.

Figure 10:
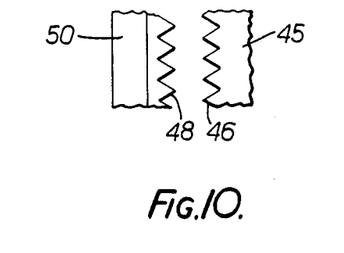
FIG. 10 is a detail view illustrating the profile of the gear teeth.

The assembly of the slide member 39, sleeve 40 and guide tube 15 for converting the linear movement of the piston 23 into rotation of the output member 53 is the same as in the actuator of FIGS. 1-3. However, the teeth 46-49 of the flange plate 45 and plates 50,51 are slightly different in that they have profiles of saw-tooth form, as indicated in FIG. 10. Because they slope at both front and rear faces it is ensured that the flange plate 45 will be displaced to disengage the plates 50,51 upon rotation of the manual adjustment shaft 64 if the hydraulic power circuit has failed leaving the teeth, 46,48 or 47,49 engaged.

To provide a feedback signal indicating the position of the actuator, and hence the valve to which it is coupled, position sensors 120 are included. As illustrated the sensors consist of potentiometers 121 driven by gears carried on the shaft 64 through gear boxes 122. Of course other known kinds of position monitoring devices could be used in place of the potentiometers. The actuator includes also a visual indicator which takes the form of a pointer 123 fixed on a shaft 124 protruding through the rear end of the casing, the shaft 124 being coupled through a gear box 125 to a pinion 126 carried on the shaft 64.

The operation of the valve actuator of FIGS. 4 to 10 is essentially the same as that described above for the actuator of FIGS. 1-3. Thus, an hydraulic pressure pulse supplied to cylinder chambers 25,103 drives the pistons 23,101 forwardly to shift the sleeve 40 to bring teeth 46,48 into engagement and then to rotate the sleeve 40, e.g. clockwise one indexing step, turning with it the valve adjusing member. Upon release of the pressure, the centering devices 110,111 return the pistons to their initial positions, the teeth 46,48 being disengaged and the sleeve then being rotated in reverse direction back to its initial angular position. A further pulse delivered to the chambers 24,103 will then produce another indexing step of the member 53 in exactly the same manner. The position of the valve under control can be monitored remotely by the signals emitted by the position sensors 120, and a visual indication is provided simultaneoulsy by the pointer 123.

If the pressure pulses are supplied to the chambers 24,102, the pistons 23,101 are driven so that teeth 47,49 are brought into engagement and the output member 53 is indexed around in the opposite direction, i.e. counter clockwise.

I claim:

1. A valve actuator comprising a support frame, a rotatable valve adjusting member carried by the frame for engagement with a valve spindle, fluid actuating means mounted on the frame substantially coaxially with said valve adjusting member, the fluid actuating means defining two chambers and including a reciprocable output member having a normal position, said chambers having means for supplying fluid pressure signals thereto for actuating said output member to reciprocate in opposite directions from said normal position, a rotatable driving member, means for converting linear movement into rotational movement coupled between said output member and said driving member, rotation transmitting means to connect kinematically the driving member to the valve adjusting member for rotation of the driving member to rotate the valve adjusting member, fluid pressure operable means for engaging said rotation transmitting means for the driving member to rotate the valve actuating member during a working stroke of the output member away from said normal position and for disengaging said rotation transmitting means for the driving member to rotate independently of the valve adjusting member during a return stroke of the output member towards said normal position, whereby fluid pressure signals supplied to said fluid operable means and to the respective chambers of the fluid actuating means cause the valve adjusting member to be indexed around selectively in opposite directions of rotation of said member for adjusting the spindle of a valve to which the actuator is connected.

2. A valve actuator according to claim 1, wherein the fluid actuator means comprises a piston and cylinder device coaxial with the rotatable member, the piston separating said two chambers within the cylinder and having a normal control position in the cylinder.

3. A valve actuator according to claim 2, wherein the cylinder is mounted on the support frame and the piston is coupled to the output member.

4. A valve actuator according to claim 1, wherein said fluid pressure operable means comprises two chambers communicating with the respective chambers of the fluid actuating means, and said fluid pressure operable means being arranged to engage said rotation transmitting means in response to supply of pressure fluid to either one or the other of said the chambers thereof.

5. A valve actuator according to claim 3, wherein a spring device is connected to the piston for returning the piston to the normal position when the pressure in the chambers is released.

6. A valve actuator according to claim 1, wherein said rotation transmitting means is normally disengaged, and means is provided to enable the valve adjusting member to be rotated manually when the rotation transmitting means is disengaged.

7. A valve actuator according to claim 6, wherein the rotation transmitting means comprises a driven member, said driving member being movable axially into and out of cooperation with the driving member by said fluid pressure operable means.

8. A valve actuator according to claim 7, wherein the driving member and driven member are provided with axially opposed driving teeth, said teeth being brought into cooperation when the rotation transmitting means is engaged.

9. A valve actuator according to claim 8, wherein the teeth have sloping front and rear faces.

10. A valve actuator according to claim 7, wherein the driven member is movable axially in opposite directions from a normal centre position to engage said driving member.

11. A valve actuator according to claim 6, wherein a casing having front and rear ends is provided and houses the fluid actuating means, the converting means and the rotation transmitting means, the valve adjusting member projects at the front end of the casing, and the means for rotating manually the valve adjusting member comprises a shaft protruding through the rear end of the casing.

12. A valve actuator according to claim 6, wherein said fluid pressure operable means for engaging the rotation transmitting means comprises a fluid actuator mounted on the frame parallel with said fluid actuating means.

13. A valve actuator according to claim 12, wherein a spring return device is provided for disengaging the rotation transmitting means when the fluid actuator is depressurised.

14. A valve actuator according to claim 12, wherein said fluid actuator and said fluid actuating means comprise respective cylinders formed within a common cylinder block.

15. A valve actuator according to claim 1, wherein the converting means comprises a slide member connected to the output member of the fluid actuating means to be driven thereby, a stationary guide member, a rotating member, and means interconnecting the slide member, the guide member and the rotating member, whereby the rotating member is caused to rotate in response to linear displacement of the slide member relative to the guide member and the rotating member.

16. A valve actuator according to claim 15, wherein the rotating member is a sleeve, the guide member is a tube coaxial with the sleeve and the slide member is located within the sleeve and guide tube.

17. A valve actuator according to claim 16, wherein the interconnecting means is fast for movement with the slide member and engages in respective slots formed in the sleeve and guide tube, one of the slots extending longitudinally and the other extending along a helical path.

18. A valve actuator according to claim 17, wherein the interconnecting means comprises a pair of rollers carried on a transverse pin fixed to the slide member, said rollers respectively engaging in said slots.

19. A valve actuator comprising a support frame, a rotatable valve adjusting member carried by the frame for engagement with a valve spindle, linear fluid actuation means mounted on the frame substantially coaxially with said valve adjusting member, means for converting linear movement into rotation including a slide member coupled to the linear fluid actuator means to be driven thereby in opposite direction from a central position, a sleeve member and means acting between the slide member and sleeve member for the sleeve member to be rotated in response to displacement of the slide member longitudinally of the sleeve member, disengageable rotary driving means including a driving member fast with said sleeve member, and a driven member fast with said valve adjusting member, a spring device coupled to the sleeve member normally to hold the driving member in a position disengaged from the driven member, the driving member being movable in either of two directions from the disengaged position to engage the driven member, fluid pressure actuated means coupled to the sleeve member to shift the sleeve member axially to engage the driven member, means for supplying fluid pressure signals to the linear fluid actuating means and the fluid pressure actuated means to displace the sleeve member axially to engage the driving and driven members and then rotate the sleeve, whereby the actuator is operable to index the valve adjusting member around in opposite directions of rotation, and a device coupled to the valve adjusting member to enable the adjusting member to be rotated manually when the rotary driving means is disengaged.

20. A valve actuator according to claim 1 or 19, wherein a position sensor is coupled to the valve adjusting member for emitting a signal indicative of the position of the valve spindle.

21. A valve actuator according to claim 1 or 19, wherein an externally visible indicator is coupled to the valve adjusting member to provide a visual indication of the position of the valve spindle.

22. A valve actuator according to claim 19 or 21, wherein position sensor means for emitting a signal indicative of the position of the valve spindle and or externally visible indicator means for providing a visual indication of the position of the valve spindle are geared to a shaft, the shaft being geared to the valve adjusting member and being rotatable manually to rotate the valve adjusting member.

* * * * *